United States Patent [19]

Porambo

[11] Patent Number: 5,379,449
[45] Date of Patent: Jan. 3, 1995

[54] AUTOMOTIVE RADIO EMPLOYING MULTIPATH CORRECTION STRATEGY BASED ON VEHICLE SPEED

[75] Inventor: Sylvester P. Porambo, Canton, Mich.

[73] Assignee: Ford Motor Company, Dearborn, Mich.

[21] Appl. No.: 979,955

[22] Filed: Nov. 23, 1992

[51] Int. Cl.$^6$ .......................... H04B 7/08; H04B 1/12; H04H 5/00
[52] U.S. Cl. ................................ 455/52.3; 455/277.2; 455/297; 381/13
[58] Field of Search ................ 455/56.1, 62, 63, 67.1, 455/132, 134, 135, 10, 52.1, 52.3, 238.1, 272, 277.1, 277.2, 65, 295, 296, 297; 381/86, 13, 10; 324/160, 166

[56] References Cited

U.S. PATENT DOCUMENTS

| | | | |
|---|---|---|---|
| 2,224,678 | 12/1940 | Hathaway | 250/20 |
| 3,693,088 | 9/1972 | Rustako, Jr. et al. | 455/56.1 |
| 4,157,455 | 6/1979 | Okatani et al. | 179/1 GM |
| 4,495,653 | 1/1985 | Hamada | 455/277 |
| 4,499,606 | 2/1985 | Rambo | 455/277.2 |
| 4,710,958 | 12/1987 | Tazaki | 381/10 |
| 5,034,984 | 7/1991 | Bose | 381/86 |
| 5,036,543 | 7/1991 | Ueno | 381/94 |
| 5,105,150 | 4/1992 | Liu | 324/160 |
| 5,113,446 | 5/1992 | Kennedy | 381/13 |

FOREIGN PATENT DOCUMENTS

| | | | |
|---|---|---|---|
| 2501883 | 7/1976 | Germany . | |
| 56-52941 | 5/1981 | Japan . | |
| 56-149125 | 11/1981 | Japan | 455/238.1 |
| 56-149126 | 11/1981 | Japan . | |
| 56-149128 | 11/1981 | Japan | 455/297 |
| 1-149619 | 6/1989 | Japan | 455/297 |
| 3-148923 | 6/1991 | Japan | 455/238.1 |
| 3-190331 | 8/1991 | Japan | 455/238.1 |

Primary Examiner—Reinhard J. Eisenzopf
Assistant Examiner—Lisa Charouel
Attorney, Agent, or Firm—Mark Mollon; Roger L. May

[57] ABSTRACT

An automotive radio system employs a plurality of corrective actions in response to the detection of multipath interference to reduce distortion audible to a listener. The speed of the vehicle is determined since the number of multipath events per unit time and the expected duration of each multipath event vary according to vehicle speed. The corrective action taken in response to detection of multipath interference depends upon the vehicle speed. In a diversity antenna system, antenna switching is suspended at high vehicle speed while filtering of the audio output to reduce noise is suspended at lower vehicle speeds.

9 Claims, 2 Drawing Sheets

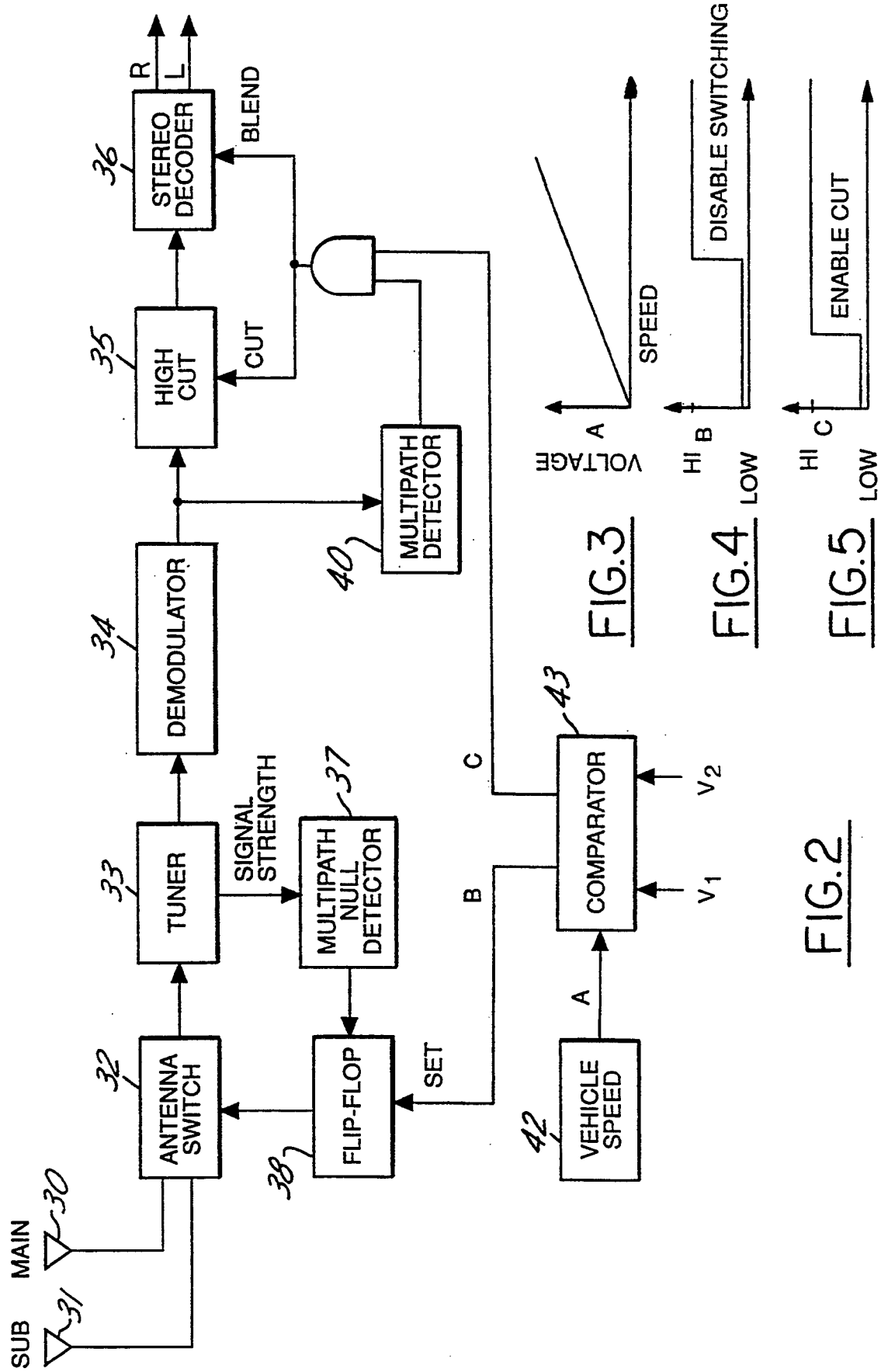

AUTOMOTIVE RADIO EMPLOYING MULTIPATH CORRECTION STRATEGY BASED ON VEHICLE SPEED

BACKGROUND OF THE INVENTION

The present invention relates generally to the reduction of multipath distortion in an automotive radio system, and more specifically to employing various multipath correction actions in accordance with measured vehicle speed.

The problem of multipath distortion in radio receivers is well known. Multipath occurs when radio frequency (RF) signals following direct and indirect (i.e., reflected) paths from a transmitter to a receiver interfere with each other at the receiver. Reflections can be caused by hills and buildings, for example.

Constructive and destructive interference of signals caused by interaction between the reflections and the direct line of sight transmission causes both signal distortion and rapid fluctuations in the received field intensity, especially in moving vehicles. Multipath is a particularly annoying problem in reception of FM stereo broadcasts because the stereo information is contained at higher frequencies more susceptible to multipath distortion.

Various prior art techniques are known for detecting and minimizing the effects of multipath interference. The occurrence of multipath is most often detected by monitoring the received signal strength for fluctuations and/or measuring high frequency noise in a demodulated output of the receiver. Various corrective actions are also known, such as reducing stereo separation by filtering high frequencies from the demodulated output or reducing the stereo blend control.

Diversity antenna systems are also employed to alleviate multipath effects. Since multipath effects are space-dependent, diversity receivers employ at least two antennas separated in space by an amount sufficient to receive the broadcast radio signals over independent signal paths, so that the separate antennas are not subject to the same multipath effects at the same time.

In spite of the application of these techniques to attack distortion caused by multipath interference, radio receiver performance continues to suffer from multipath.

SUMMARY OF THE INVENTION

It is an object of the invention to improve overall performance of an automotive radio system in the presence of multipath. The present invention has the advantage of integrating and coordinating the operation of various multipath strategies in a manner adapted to the automotive environment.

The present invention controls a radio receiver in a vehicle by generating a speed signal proportional to the speed at which the vehicle moves. A radio signal is received in the radio receiver, and a multipath signal is generated upon the detection of the presence of multipath distortion in the radio signal. A corrective action is selected within the radio receiver in response to the multipath signal and the speed signal. Specifically, the corrective action includes switching between diversity antennas if the speed signal indicates a speed less than a first predetermined speed. Also, the corrective action includes filtering of the radio signal if the speed signal indicates a speed greater than a second predetermined speed. Preferably, the second predetermined speed is less than the first predetermined speed.

BRIEF DESCRIPTION OF THE DRAWINGS

FIG. 2 is a block diagram showing a second embodiment of the present invention.

FIG. 3 shows a speed signal as vehicle speed increases.

FIG. 4 shows a signal for controlling operation of diversity antenna switching for the embodiment in FIG. 2.

FIG. 5 shows a second control signal for controlling a filtering operation in the embodiment of FIG. 2.

DETAILED DESCRIPTION OF PREFERRED EMBODIMENTS

Figure 1:
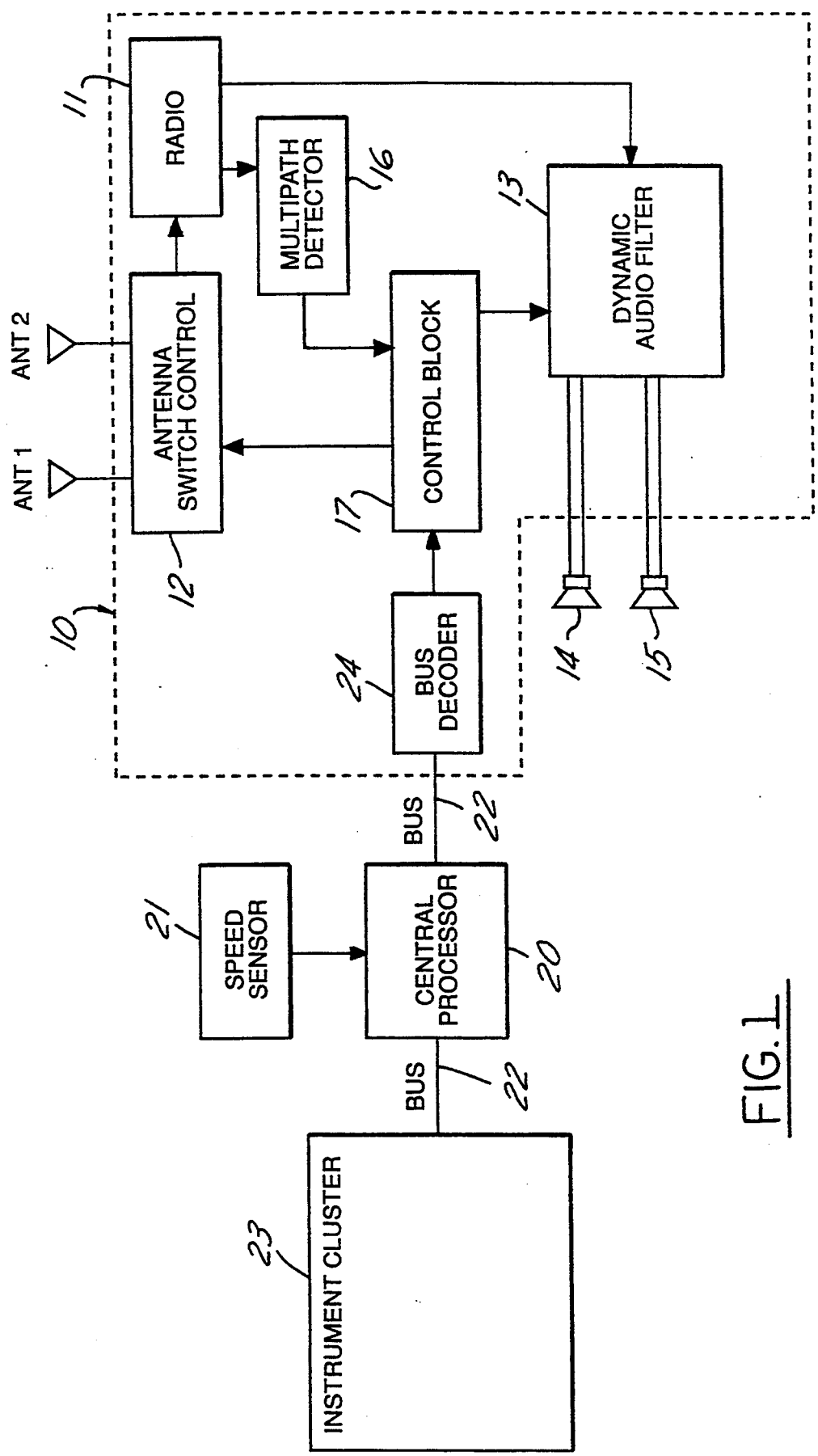
FIG. 1 is a block diagram showing a first embodiment of a vehicle system according to the present invention.

A radio receiver in a moving vehicle experiences multipath events of various duration and severity as it moves through areas of multipath interference. With increasing vehicle speed, the number of multipath events per unit time increases, especially in city or mountainous conditions, but the duration of any single multipath event is likely to decrease. On the other hand, at low speed driving conditions, such as stop and go city driving, the number of multipath events per unit time decreases while the duration of any single multipath event increases. As the number and duration of multipath events changes, the effectiveness of any particular corrective action also changes. Therefore, the present invention detects vehicle speed and selects appropriate use of multipath corrective actions in accordance with vehicle speed. For example, diversity antenna switching is most effective at low speeds where the number of multipath events is low but the duration of a single multipath event is long. At high speeds, with a large number of multipath events of short duration, diversity antenna switching at a high rate would increase noise from the switching itself and would be less effective at reducing multipath effects. The use of dynamic high-cut filtering to reduce multipath effects merely substitutes one type of distortion for another, and thus is undesirable whenever multipath has been eliminated by antenna switching. However, such filtering is more desirable at higher speeds because antenna switching becomes ineffective and because the filtering can be applied for a shorter length of time since the multipath event is of shorter duration.

Turning to FIG. 1, an automotive audio system 10 employing a conventional FM stereo radio receiver is shown. Diversity antennas ANT1 and ANT2 are each connected to a respective input of a switch control 12. The output of switch control 12 provides antenna signals from a selected one of the diversity antennas to radio 11. Stereo outputs from radio 11 are connected to a switchable dynamic audio filter 13 which provides output audio signals to a pair of speakers 14 and 15. A multipath detector 16 is connected to radio 11 for detecting multipath events and providing a multipath signal to a control block 17.

The use of electronic systems, such as electronic instrument panels, electronic speed control, electronic temperature control and electronic audio systems, has been increasing in modern vehicles. In order to reduce the number of microprocessors required in each vehicle, integrated central controllers have been employed to control several different systems at once. Thus, a central processor 20 is connected to a speed sensor 21. Center processor 20 communicates with various electronic systems on a common bus 22. Bus 22 is connected to an instrument cluster 23 for displaying vehicle speed to a driver. A bus decoder 24 in audio system 10 also receives speed information from bus 22. Alternatively, a vehicle can employ a serial multiplex networks for communicating data between various electronic systems. In either case, bus decoder 24 receives vehicle speed information originating in speed sensor 21 and the resulting speed signal is provided to control block 17.

Control block 17 determines a speed range within which the speed signal falls. The preferred embodiment recognizes a first low speed range wherein only antenna switching is employed, a medium speed range wherein both antenna switching and dynamic filtering are employed, and a high speed range wherein only dynamic filtering is employed. Thus, control block 17 is connected to antenna switch control 12 for switching between antennas in response to a multipath signal from multipath detector 16 when the speed signal falls within the low or medium speed ranges. Control block 17 is connected to dynamic audio filter 13 so that the filtering action is activated only in response to the multipath signal when the speed signal falls in the medium and high speed ranges. The dynamic audio filtering is preferably a high-cut, i.e., lowpass, filtering to eliminate multipath noises.

In the alternative embodiment of FIG. 2, a main antenna 30 and a subantenna 31 are connected to respective inputs of an antenna switch 32. The output of antenna switch 32 is connected to the input of a tuner 33 that produces an intermediate frequency (IF) signal that is demodulated by a demodulator 34. The demodulated signal is provided through a switchable high-cut filter 35 to a stereo decoder 36 producing left and right stereo output signals.

Tuner 33 also provides a signal strength signal to a multipath null detector 37 which controls a flip-flop 38. The output of flip-flop 38 controls the setting of antenna switch 32 between a setting for the main antenna and a setting for the subantenna. When destructive multipath interference is present, the signal strength voltage from tuner 33 falls below a predetermined voltage which is detected by multipath null detector 37. In response to that condition, flip-flop 38 is altered to its opposite state.

A multipath detector 40 also receives the demodulated output from demodulator 34. Multipath detector 40 monitors the average noise level in a pass-band distinct from the broadcasted signal, e.g., a pass-band adjacent the stereo pilot signal, in order to detect the onset of multipath. A multipath signal from multipath detector 40 is coupled to one input of an AND gate 41 which acts as a transmission gate to control application of any corrective action (e.g., dynamic filtering in high-cut filter 35 or reduction of stereo blend in stereo decoder 36).

Vehicle speed information is obtained from a vehicle speed sensor 42. A speed signal A is provided to a comparator 43. A first fixed reference voltage $V_1$ and a second fixed reference voltage $V_2$ are provided to comparator 43. Comparator 43 provides a first control signal B to the set SET input of flip-flop 38 and a control signal C to the second input of AND gate 41. When speed signal A exceeds voltage $V_1$, control signal B switches from a low to a high level thereby forcing flip-flop 38 into a set condition. This also forces selection of main antenna 30 and prevents further diversity antenna switching.

If vehicle speed signal A is less than voltage $V_2$, control signal C is low and the output of AND gate 41 is low (i.e., the transmission gate is off), thereby preventing operation of high-cut filter 35 and preventing any blend reduction in the stereo decoder 36. However, when speed signal A exceeds voltage $V_2$, control signal C goes high and dynamic filtering actions are permitted through AND gate 41 whenever a multipath signal is present.

As shown in FIG. 3, speed signal A has an increasing voltage with increasing speed. As shown in FIG. 4, control signal B switches to a high level at a speed corresponding to a speed signal greater than voltage $V_1$. FIG. 5 shows that control signal C switches a high level at a lower speed corresponding to voltage $V_2$, which is less than $V_1$. Therefore, improved radio performance is obtained in the presence of multipath since the multipath strategy adopted is dependent upon vehicle speed.

What is claimed is:

1. A method for controlling a radio receiver in a vehicle comprising the steps of:
   generating a speed signal proportional to the speed at which said vehicle moves;
   receiving a radio signal at said radio receiver;
   generating a multipath signal upon detection of the presence of multipath distortion in said radio signal; and
   selecting a corrective action within said radio receiver in response to said multipath signal and said speed signal, wherein said radio receiver includes diversity antennas and wherein said corrective action includes switching between diversity antennas if said speed signal indicates the vehicle speed is less than a first predetermined speed.

2. The method of claim 1 further comprising the step of identifying one of a plurality of speed ranges corresponding to said speed signal, and wherein said selecting step is responsive to said step of identifying.

3. The method of claim 1 wherein said corrective action includes filtering of said radio signal if said speed signal indicates the vehicle speed is greater than a second predetermined speed.

4. The method of claim 3 wherein said second predetermined speed is less than said first predetermined speed.

5. The method of claim 1 wherein said vehicle further includes a bus system for transmitting vehicle sensor and actuator signals between a plurality of electronic devices in said vehicle, said method further comprising the step of:
   receiving said speed signal in said radio receiver from said bus system.

6. Radio receiver apparatus for a vehicle comprising:
   speed sensor means for generating a speed signal proportional to the speed at which said vehicle moves;
   receiver means for receiving a radio signal;
   diversity antenna means coupled to said receiver means for providing either of at least two antenna signals in response to a selection signal;
   multipath means for generating a multipath signal upon detection of the presence of multipath distortion in said radio signal; and
   control means coupled to said speed sensor means, said receiver means, and said multipath means for selecting a corrective action within said receiver means in response to said multipath signal and said speed signal, wherein said control means changes said selection signal in response to said multipath signal when said speed signal indicates the vehicle speed is less than a first predetermined speed.

7. The apparatus of claim 6 further comprising:

filter means coupled to said receiver means for selectably highpass filtering an audio signal output from said receiver means in response to an activation signal;

wherein said control means produces said activation signal in response to said multipath signal when said speed signal indicates the vehicle speed is greater than a second predetermined speed.

8. The apparatus of claim 7 wherein said second predetermined speed is less than said first predetermined speed.

9. The apparatus of claim 6 further comprising:

bus means for interfacing with a vehicle multiplex system and for receiving said speed signal from said multiplex system.

* * * * *